United States Patent [19]

Izumo et al.

[11] 4,241,137
[45] Dec. 23, 1980

[54] PROCESS FOR PREPARING POLYTETRAFLUOROETHYLENE GRANULAR POWDER

[75] Inventors: Masanori Izumo, Neyagawa; Syunichi Nomura, Kyoto; Singo Tanigawa, Osaka, all of Japan

[73] Assignee: Daikin Kogyo Co., Ltd., Osaka, Japan

[21] Appl. No.: 854,003

[22] Filed: Nov. 22, 1977

Related U.S. Application Data

[63] Continuation-in-part of Ser. No. 568,824, Apr. 17, 1975, abandoned, which is a continuation of Ser. No. 382,218, Jul. 24, 1973, abandoned.

[51] Int. Cl.³ .......................... B32B 5/16; C08F 6/00; C09C 1/56
[52] U.S. Cl. .................................. 428/402; 264/117; 425/DIG. 101; 528/494; 528/497; 528/498; 528/499
[58] Field of Search .................. 428/402, 220, 332; 264/117; 425/DIG. 101; 528/494, 499, 497, 498

[56] References Cited

U.S. PATENT DOCUMENTS

| | | | |
|---|---|---|---|
| 3,265,679 | 8/1966 | Black et al. | 428/402 |
| 3,527,857 | 9/1970 | Fitz | 264/117 |
| 4,123,606 | 10/1978 | Malhotra | 528/499 |

FOREIGN PATENT DOCUMENTS 1100388 1/1968 United Kingdom.

*Primary Examiner*—Thomas J. Herbert, Jr.
*Attorney, Agent, or Firm*—Armstrong, Nikaido, Marmelstein & Kubovcik

[57] ABSTRACT

A process for preparing a polytetrafluoroethylene granular powder which comprises subjecting a finely divided polytetrafluoroethylene to agitation in an aqueous medium consisting of water and organic liquid having a specific surface tension and being incompatible with water in an apparatus to form agglomerates, passing said agglomerates through a crushing mechanism and continuously recycling said crushed agglomerates for further agitation and crushing, said crushing mechanism being capable of lowering an average particle size of the agglomerates composed of primary particles having a particle size of 1 to 200μ by partially crushing agglomerated particles having an improper large particle size or abnormally large aggregates. The obtained polytetrafluoroethylene granular powder has a narrow size distribution and an improved flowability, in which at least 90% by weight of a whole granular powder has a particle size of at most 1000μ and an average particle size of the granular powder falls in the range of 100 to 500μ and at least 60% by weight of a whole granular powder has a particle size of 0.7 to 1.3 times its average particle size.

11 Claims, 3 Drawing Figures

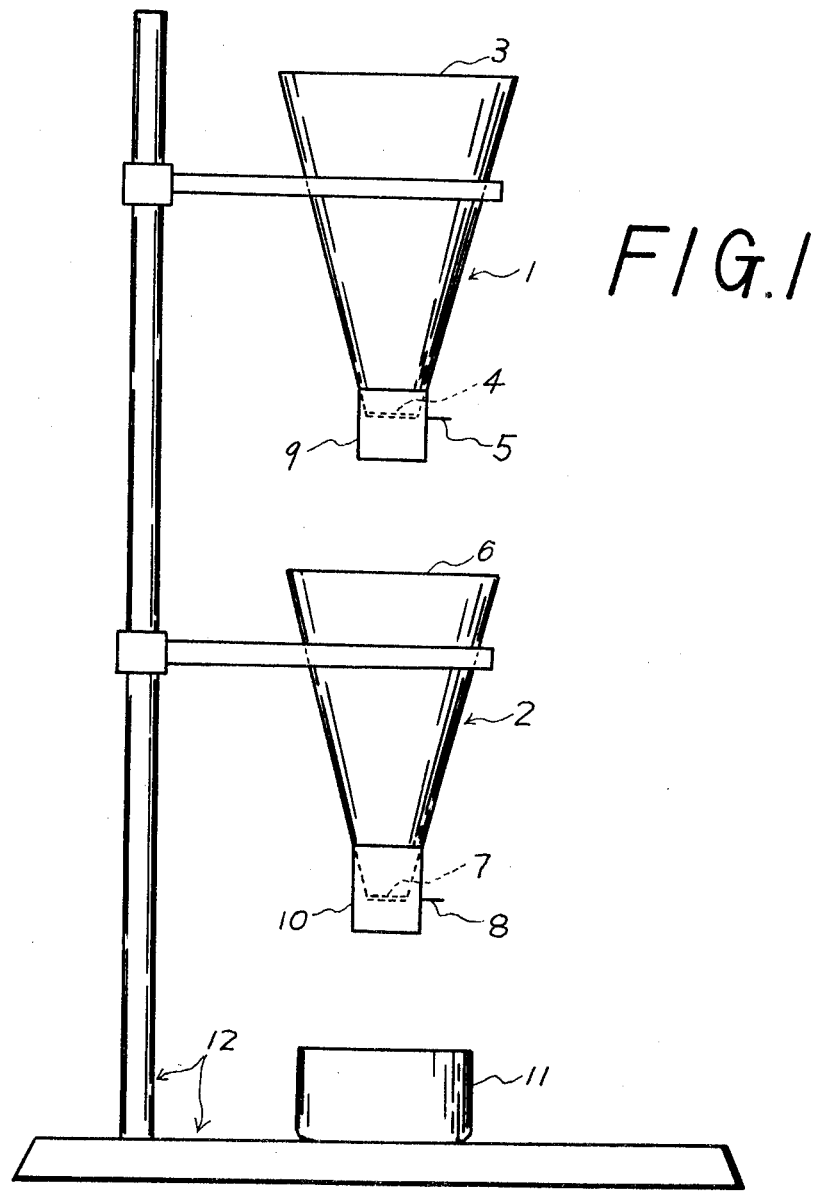

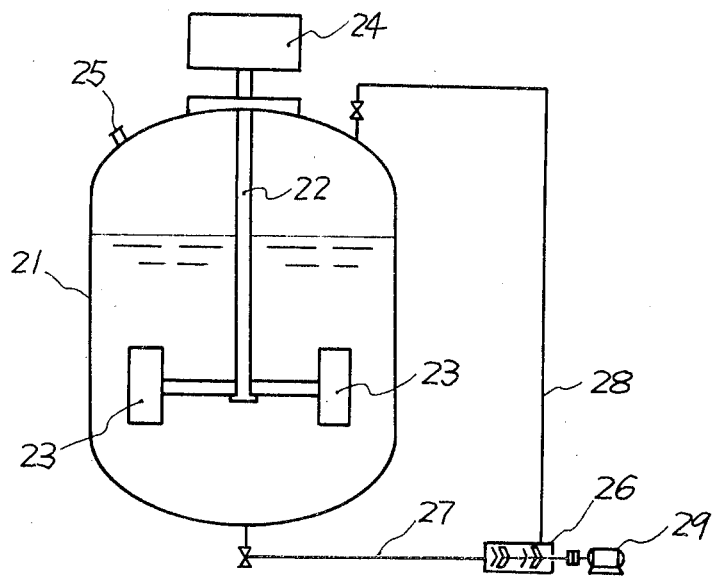
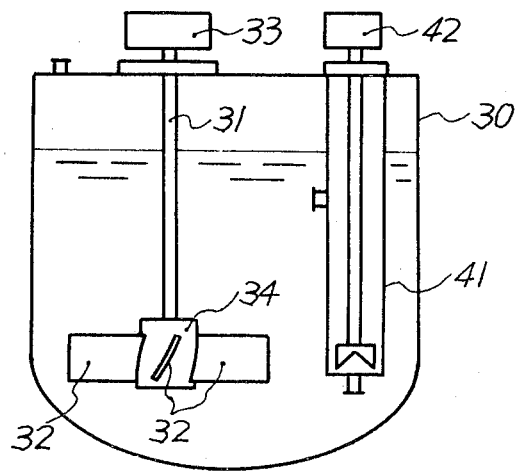

PROCESS FOR PREPARING POLYTETRAFLUOROETHYLENE GRANULAR POWDER

CROSS-REFERENCES TO RELATED APPLICATIONS

This application is a continuation-in-part of application Ser. No. 568,824 filed on Apr. 17, 1975 and now abandoned which is a continuation application of application Ser. No. 382,218 filed on July 24, 1973 and now abandoned.

BACKGROUND OF THE INVENTION

The present invention relates to a process for preparing polytetrafluoroethylene granular powder, more particularly to a process for preparing polytetrafluoroethylene granular powder having a sharp size distribution and an improved flowability.

In general, a polytetrafluoroethylene granular powder is required (1) to have excellent flowability, (2) to be soft and to be pressed by a comparative low pressure to form a dense preformed article, and (3) to have a large bulk density, since it is molded by a manner similar to that in powder metallurgy differing from the molding method for another thermoplastic resins such as melt extrusion, injection or compression molding.

For the purpose of preparing a polytetrafluoroethylene granular powder satisfying the above-mentioned requirements, there have been proposed various processes for preparing the granular powder consisting of agglomerate composed of primary particles, which has a high bulk density, an excellent flowability and a softness the same as in the primary particle, by agglomerating a polytetrafluoroethylene powder which has been obtained by pulverizing the raw polytetrafluoroethylene powder prepared by suspension-polymerization of tetrafluoroethylene. For instance, U.S. Pat. No. 3,265,679 describes a process which comprises wetting a polytetrafluoroethylene powder with an organic liquid being capable of wetting the powder and subjecting to agitation of the wetted powder to give granules having a dry sieve size in the range of 300 to 3000μ. Also British Pat. No. 1,100,388 and U.S. Pat. No. 3,527,857 describe a process for agglomerating a polytetrafluoroethylene powder by agitating the same in an aqueous medium containing an organic liquid capable of wetting the powder. According to the process described in British Pat. No. 1,100,388, there can be obtained a polytetrafluoroethylene granular powder consisting of secondary agglomerates composed of primary particles of particle size of less than 200μ, having a particle size in the range of 100 to 5000μ, a bulk density of more than 400 g./liter and an excellent flowability compared with conventional ones and giving a dense molded article, which process comprises agitating in water polytetrafluoro ethylene powder of a particle size of 1 to 200μ after wetting with a water-insoluble organic liquid having a surface tension of at most 35 dynes/cm. The thus obtained polytetrafluoroethylene granular powder has merits that the flowability of the powder is superior and the aggregation of the powder as a whole hardly occurs on storage and transferring or handling since the particle is spherical or nearly spherical and its outer surface is extremely smooth. However, according to this process, the obtained granular powder has a tendency that its particle size is large and not uniform, moreover contains extremely large particles as large as 5000μ. In case of molding from such a granular powder containing extremely large particles, the surface of molded article becomes uneven and, for instance, the surface grinding of the molded article is required for making the surface smooth when it is employed as a packing.

According to the investigations by the present inventors, it has been found that a polytetrafluoroethylene granular powder must possess the following properties in addition to the properties described in the above-mentioned British Pat. No. 1,100,388.

(a) In consideration of the fact that the smaller particle size of granular powder, the better mechanical properties and smoothness of a molded article, it has been found out that the upper limit of average particle size is 500μ. In particular, it is necessary for obtaining a molded article of small size with smooth surface that the average particle size of granular powder be at most 500μ. However, the smaller the particle size, the poorer flowability and non-aggregating property. Therefore, as a matter of course, a granular powder has an under limit in the particle size, and it has been found out that the under limit of the average particle size is about 100μ.

(b) In case the powder contains extremely large particles, even if the average particle size of the granular powder falls in the range of 100 to 500μ, surface of molded artilce does not become even. Also in case the powder containes extremely small particles, the flow-ability of granular powder is decreased. In view of this point, it has been found that at least 90% by weight of a whole granular powder must have a particle size of at most 1000μ and moreover at least 60% by weight of a whole granular powder must have a particle size in the range of 0.7 to 1.3 times its average particle size, especially 0.75 to 1.25 times.

(c) It is required that the powder flowability, an easiness of flowing of a granular powder, which is defined hereinafter, must be at least 3. In case the powder flowability of a granular powder is less than 3, it is difficult to charge the powder into a hollow of a mold for a short period of time particularly when using it in automatic molding.

(d) It is required that the surface roughness indicating a degree of smoothness of a molded article obtained from a granular powder, which is defined hereinafter, must be at most 2.0, especially at most 1.5.

On the other hand, it has been apparent that a granular powder satisfying the above properties cannot be obtained by the process of British Pat. No. 1,100,388 on industrial scale.

According to the process of British Pat. No. 1,100,388, a granular powder satisfying the above conditions may be prepared when a small amount of polytetrafluoroethylene powder is treated by a high speed agitation in a comparatively small-scale apparatus, but this process cannot be utilized on industrial scale production since an extremely high speed agitation and a considerable power are required. Moreover when an apparatus is large-scale, the amount of extremely large particles and extremely small particles in the obtained granular powder is increased and a granular powder having a uniform particle size cannot be obtained since continuously a uniform power could be hardly provided as a whole powder even if the agitation speed is increased. As a result, a size distribution of an obtained granular powder does not fall in the above-mentioned range and a flowability is decreased and a surface roughness of a molded article obtained from a granular powder becomes poor.

Further, according to the process by agitating polytetrafluoroethylene powder in water containing organic liquid, a particle size of obtained granular powder may be decreased by employing the least amount of organic liquid.

However, in that case, the surface of each particle does not become sufficiently smooth and the flowability of the obtained granular powder is poor so that it cannot be employed for an automatic molding, and the granular powder does not satisfy the above-mentioned properties.

U.S. Pat. No. 3,527,857 describes that agglomerated powder having a relatively small particle size which satisfies the property (a) among the above-mentioned properties (a) to (d) is obtained by this process, but according to the investigation by the present inventors, it has been found that this powder does not also satisfy the above-mentioned property (b), and as a result, the powder flowability of this powder is very poor. Although this patent describes that the agglomerated powder having a relatively small particle size is obtained, it is considered that this result is produced by the use of a very large agitation evergy and in this point the process of this patent is undesirable. Moreover, when the amount of the treated powder in one treatment is scaled up to a degree of industrially practicing the process, there is required a larger agitation energy which is not industrially acceptable.

Further, according to the process of U.S. Pat. No. 3,265,679 which comprises by mechanically agitating a finely divided polytetrafluoroethylene powder in the presence of only an organic liquid without using water as stated before, the obtained powder does not satisfy all of the above-mentioned properties (a) to (d).

OBJECT OF THE INVENTION

It is an object of the present invention to provide an improved polytetrafluoroethylene granular powder.

Further object of the invention is to provide a polytetrafluoroethylene granular powder having a uniform size distribution and an excellent flowability.

More further object of the invention is to provide a polytetrafluoroethylene granular powder having an excellent molding property and being capable of giving an article of which surface is smooth.

Still further object of the invention is to provide a process of preparing an improved polytetrafluoroethylene granular powder.

These and other objects of the invention will become apparent from the description hereinafter.

BRIEF DESCRIPTION OF THE DRAWINGS

FIG. 1 is a schematic view showing an apparatus for measuring the powder flowability; and FIGS. 2 and 3 are schematic front view showing apparatuses employed in the process of the present invention.

DETAILED DESCRIPTION

It has now been found that the above-mentioned objects can be accomplished by subjecting a finely divided polytetrafluoroethylene having an average particle size of 1 to 200$\mu$, preferably 5 to 50$\mu$ to agitation in an aqueous medium consisting of water and an organic liquid having a surface tension of at most 35 dynes/cm. at 25° C. and being incompatible with water in an apparatus to form agglomerates, passing said agglomerates through a crushing mechanism and continuously recycling said crushed agglomerates for further agitation and crushing, said crushing mechanism being capable of lowering an average particle size of the agglomerates composed of primary particles having an average particle size of 1 to 200$\mu$ by partially crushing agglomerated particles having an improper large particle size or abnormally large aggregates, said organic liquid being employed in an amount of 20 to 300% by weight and water being employed in an amount of at least 130% by weight and said aqueous medium being employed in an amount of 150 to 5000% by weight, respectively, to said finely divided polytetrafluoroethylene. The obtained polytetrafluoroethylene granular powder consists essentially of agglomerates composed of primary particles having an average particle size of 1 to 200$\mu$, especially 5 to 50$\mu$ and being substantially spherical or nearly spherical, in which at least 90% by weight of a whole granular powder has a particle size of at most 1000$\mu$ and an average particle size of the granular powder falls in the range of 100 to 500$\mu$ and at least 60% by weight of a whole granular powder has a particle size of 0.7 to 1.3 times its average particle size, especially 0.75 to 1.25 times and the powder flowability defined hereinafter of the granular powder is at least 3 and the surface roughness defined hereinafter of a molded article prepared from the granular powder is at most 2.0, especially at most 1.5. Further, the polytetrafluoroethylene granular powder of the invention has generally a bulk density of at least 700 g./liter, especially 700 to 950 g./liter.

An average particle size of the polytetrafluoroethylene granular powder is determined by a usual manner for measurement as follows: Standard sieves of 10, 20, 32, 48 and 60 mesh ("mesh" in the specification means "inch mesh") are superposed in order from the top, and the powder is placed in the 10 mesh sieve. The sieves are shaken to make the fine powder fall in order through them, and the ratios of the powder remained on each sieve are calculated by percentage by weight. On a log probability paper, thus obtained cumulative weight percentage figures are plotted on axis of ordinate against sieve-opening size on axis of abscissa, and these points are connected by a straight line. An average particle size is the value corresponding to cumulative percentages of 50. Further, from thus obtained graph, it can be readily judged whether or not more 60% by weight of the whole powder falls in the range of 0.7 to 1.3 times the average particle size.

The powder flowability of polytetrafluoroethylene granular powder is determined as follows: As shown in FIG. 1, an upper hopper 1 and an under hopper 2 which are fixed with a supporter 12 to accord their center-line are employed as a measuring apparatus. These hoppers are made of stainless steel. The upper hopper 1 has an entrance 3 of 74 mm. in diameter and an exit 4 of 12 mm. in diameter, and a height from the entrance 3 to the exit 4 is 123 mm. A bottom plate 5 is provided at the exit 4 to make the powder remain or fall. The under hopper 2 has an entrance 6 of 76 mm. in diameter and an exit 7 of 12 mm. in diameter, and a height from the entrance 6 to the exit 7 is 120 mm. Also at the exit 7, a bottom plate 8 is provided. A distance between both hoppers is adjusted to keep a distance between both bottom plates into 15 cm. Further, the exits 4 and 7 are covered with the covers 9 and 10, respectively, and reference 11 is the accepting vessel for the powder.

After allowing 200 g. of the powder to stand for at least 4 hours in a room adjusted at a temperature of 23.5° to 24.5° C. and sieving the powder with 10 mesh sieve corresponding to a sieve opening of 1680$\mu$, the measurement of the powder flowability is carried out at the same temperature as follows:

(1) At first, the powder full-filled in a 30 ml. cup is placed in the upper hopper 1, and, immediately after, the bottom plate 5 is pulled out to make the powder fall. When the powder does not fall, it is made to fall by poking with a wire. After allowing the powder to stand for 15±2 seconds from when the powder is completely fallen into the under hopper 2, the bottom plate 8 is pulled out and it is observed whether or not the powder flows out of the exit 7. In case the powder flows down within 8 seconds completely, the powder is judged as to have fallen.

(2) The same measurement is repeated 3 times to observe whether the powder falls or not. In case the powder flows down in two or three measurements, the flowability is judged as "good." In case the powder never falls in three measurements, the flowability is judged as "bad." In this repetition, when the powder flows down once in three measurements, the same measurement is further repeated 2 times. In case the powder flows down every 2 times, the flowability is eventually judged as "good," and when the powder does not flow down at least one time, the flowability is eventually judged as "bad."

(3) The powder judged as "good" in accordance with the above measurement is subsequently subjected to the same process of measurement as in the above item (2) except that two cups of powder are employed, in order to determine the "powder flowability." In case the flowability is judged as "good," the measurement is further carried out with 3 cups of the same powder. And thereafter the amount of powder is increased one by one in number of cups at most to 8 cups till the flowability of the powder becomes "bad." In each measurement, the powder flowed down out of the under hopper may be employed again for measurement.

(4) In the above measurement, the more the amount of the powder, that is, the more the cup's number, the less the powder falls down. In view of this point, the value obtained by subtracting 1 from the cup's number when the flowability becomes "bad" is defined as "powder flowability."

The surface roughness refers to a value determined as follows: The polytetrafluoroethylene granular powder is preformed under a pressure of 300 kg./cm.$^2$G. and then sintered at a temperature of 370° C. by means of free baking to give a molded article. The measurement is carried out by employing roughness tester SE-4 made by Kabushiki Kaisha Kosaka Kenkyusho under a provision of JIS B 0601-1970. The surface roughness is expressed by the value of the obtained central average roughness.

The particle size of the polytetrafluoroethylene granular powder of the invention is small, and besides the powder flowability is high as much as that of a conventional granular powder having a large particle size because of a narrow size distribution, smooth surface of the powder particle and a particle shape being spherical or nearly spherical. Also the granular powder of the invention has a bulk density of at least 700 g./liter, preferably 700 to 950 g./liter. The polytetrafluoroethylene granular powder being small and having an excellent powder flowability like this has been provided at the first time by the present invention.

The powder, according to the present invention, gives a molded article having a surface roughness of at most 2.0, especially at most 1.5. Since polytetrafluoroethylene granular powders hitherto known include a great amount of particles of more than 1000$\mu$ in diameter, the surface of articles obtained from such powders is extremely uneven. On the other hand, an article obtained from the instant powder has smooth surface due to its small particle size and its narrow size distribution, and therefore the smoothening of the surface of the article by such a way as skiving is unnecessary. For instance, comparing the polytetrafluoroethylene granular powder obtained in Example 1 mentioned after, which has a particle size of less than 500$\mu$, with the granular powder obtained in Comparative Example 1 mentioned after, which does not contain particles of more than 2000$\mu$ in diameter but of which about 15% by weight has a particle size of more than 1000$\mu$ and about 80% by weight has a particle size of more than 500$\mu$, the surface roughness of the former is 1.3 whereas that of the latter is 2.8.

On the other hand, since the powder flowability is poorer in case the particle size is too small, an average particle size of the granular powder should not be less than 100$\mu$.

The novel granular powder of the present invention may be conveniently prepared by a process which comprises agitating a finely divided polytetrafluoroethylene in an aqueous medium consisting of water and organic liquid having a surface tension of at most 35 dynes/cm. by using an apparatus having both of an agitating mechanism and a crushing mechanism.

In general, a finely divided polytetrafluoroethylene and water are introduced in an apparatus at first, and then the organic liquid is introduced in an apparatus, preferably introduced with agitating the content by means of spraying.

The process can give the polytetrafluoroethylene granular powder having the desired uniform particle size by means of the employment of the agitating mechanism and the crushing mechanism in which the crushing mechanism is operated at the same time as or after the agitation for agglomerating a finely divided polytetrafluoroethylene, or alternately with the agitation.

In the instant specification, the term "crushing mechanism" refers to the mechanism capable of lowering an average particle size of the agglomerates composed of primary particles by partially crushing agglomerated particles having an improper large particle size or abnormally large aggregates. In accordance with the present invention, the finely divided polytetrafluoroethylene powder is agglomerated by the effect of agitation, and even if the granular powder having a particle size of more than 5000$\mu$ is produced, such a large granular powder is crushed by utilizing a crusher at the same time as agitation or after agitation, or alternately with agitation, as stated above, to give a uniform granular powder of at most 500$\mu$ in particle size.

The thus agglomerated powder is separated from the aqueous medium and dried to give the desired granular powder of polytetrafluoroethylene. These agglomerating processes may be also carried out under a high pressure or under a reduced pressure.

The finely divided polytetrafluoroethylene suitably employed in the invention has an average particle size of 1 to 200$\mu$, preferably 5 to 50$\mu$. The finely divided polytetrafluoroethylene is prepared by grinding a raw powder which is obtained by polymerizing tetrafluoroethylene monomer in the presence of water containing a polymerization initiator, in the presence or absence of water by means of grinder such as hammer mill, grinder equipped with a vaned rotor, grinder of high energy fluid type or impact grinder. Either a fibrous powder or a non-fibrous powder may be employed without any trouble.

As the aqueous medium, a mixture of water and an organic solvent having a surface tension of at most 35 dynes/cm. at 25° C. and being incompatible with water is employed. Examples of the organic liquid are aliphatic hydrocarbons such as hexane, heptane, gasoline, kerosene or mixtures thereof, aromatic hydrocarbons such as benzene, toluene or xylene, ethers such as anisole or tetrahydrofuran, halogenated hydrocarbons such as trichloroethylene, tetrachloromethane, allyl bromide, dibromoethylene, monochlorobenzene or benzyl chloride, fluorine compounds such as trichlorotrifluoroethane, trichlorofluoromethane, tetrachlorodifluoroethane, octafluorocyclobutane, compounds having the general formulas of $Cl(CF_2CF_2Cl)_nCl$, $H(CF_2CF_2)_nCH_2OH$ and $Cl(CF_2CF_2)_nCl$ in which n is an integer of from 1 to 5, ω-monohydro-perfluorohexene, benzenetrifluoride, dibromotrifluoroethane or trichloropentafluoropropane.

The organic liquid is generally employed in an amount of 20 to 300% by weight to the finely divided polytetrafluoroethylene, and water is generally employed in an amount of at least 130% by weight to the finely divided polytetrafluoroethylene.

The aqueous medium is suitably employed in an amount of 150 to 5000% by weight to the finely divided polytetrafluoroethylene. The employment of much amount of aqueous medium that the above range brings to the economical disadvantage and on the other hand the lack of the aqueous medium makes the procedures in agglomerating and in crushing difficult. However, if a mixture of the finely divided polytetrafluoroethylene and the aqueous medium has a flowability, there is no problem in increase and decrease of the aqueous medium to some extent.

The kind of the organic liquid, especially the boiling point of the organic liquid tends to influence on the properties of the obtained granular powder. The employment of the organic liquid having a high boiling point makes hardness of the granular powder increase, and the employment of that having a low boiling point such as trichlorotrifluoroethane makes the granular powder soft and fragile. Therefore, the organic liquid is selected in accordance with the desired use of the granular powder, and in general, the organic liquid having a boiling point of 30° to 200° C., especially 30° to 100° C. is suitably employed.

It is not always necessary to employ water and the organic liquid which is purified in high purity. However, in case of employing those containing an inorganic or organic impurities, these impurities remain in the obtained polytetrafluoroethylene granular powder and, as a result, an article obtained from the granular powder is unfavorably made to color and the breakdown voltage is made to lower. Therefore, these impurities resulting in such disadvantages must be previously removed out of the aqueous medium.

According to the present invention, though usually the finely divided polytetrafluoroethylene and water are introduced at first and thereto the organic liquid is introduced with agitation and then the mixture is agitated to give the granular powder of the invention, and, if circumstances require, the finely divided polytetrafluoroethylene previously wetted by a small amount of water, the organic liquid or the mixture thereof may be admixed with the residual aqueous medium in the agitating vessel and then agitated. Also the finely divided polytetrafluoroethylene may be introduced in an agitating vessel previously charged with the aqueous medium.

The agitating temperature is suitably employed in the range of 30° to 200° C. In general, the temperature can be optionally selected and mainly selected in consideration of a boiling point of the aqueous medium.

An apparatus employed in the instant process will be explained with reference to the schematic front view in FIGS. 2 and 3. In FIG. 2, the reference 21 indicates the agitating vessel and in the agitating vessel 21 the rotor 22 is centered vertically. As the under end of the rotor 22 the agitating vane 23 is equipped radially, and the upper end of the rotor 22 is connected with motor 24. The reference 25 is the providing port for the aqueous medium, and the reference 29 is the motor. The crusher 26 is connected with the under region and the upper region of the agitating vessel 21 through the transfer pipes 27 and 28, respectively. As the crusher 26, there may be employed one making a crushing of the finely divided polytetrafluoroethylene included in the aqueous medium possible by means of rotating a cutter of turbine blade type in a cylinder with transferring the aqueous medium. Examples of such an apparatus are the pipe-line homomixer (made by Tokushukika Kogyo Kabushiki Kaisha) and the disintergrator (made by Komatsu Mfg. Co., Ltd.) which are equipped with a cutter and a stator being able to provide cutting and impact.

An aqueous medium including the finely divided polytetrafluoroethylene is introduced in the agitating vessel 21 through the providing port 25, and then agitated by means of the agitating vane 23. At the same time as the agitation or after agitation, the aqueous medium including the powder is introduced to the crusher 26 through the transfer pipe 27. By passing through the crusher 26, powders too large are crushed and the aqueous medium including the powder is returned to the agitating vessel 21 through the transfer pipe 28. Thus, an agglomerated powder having a uniform particle size can be obtained by carrying out the agitation in the agitating vessel 21 and the crushing of the largely agglomerated powder or the abnormally large aggregate in the crusher 26 at the same time or in order, or alternately. Also the similar agglomerated powder to those obtained by the above manner may be obtained only by circulating the aqueous medium including the powder with crushing the powder by means of the crusher 26 without operating the agitator. It is considered that the above reason is due to that the agitating effect is attained by the circulation of the aqueous medium including the powder.

In FIG. 3, the crusher 41 is set in parallel with the rotor 31 equipped with the agitating vane 32 in the agitating vessel 30. The references 33 and 42 are the motors for the rotor 31 and the crusher 41. The agitating vane 32 is radiately and spirally fixed on the boss 34 at the under end of the rotor 31. Therefore, in this case, the finely divided polytetrafluoroethylene included in the aqueous medium is agglomerated while the aqueous medium is agitated by the agitating vane 32 and the resultant agglomerated powder and aggregate are crushed by the crusher 41.

The present invention is more particularly described and explained by means of the following illustrative Examples.

EXAMPLE 1

A finely divided polytetrafluoroethylene was agglomerated at a temperature of 25° C. by employing an apparatus as shown in FIG. 2.

A tank having an inner diameter of 600 mm. and a height of 1200 mm., which was equipped with an arrowshaped agitating vane (as employed in turbine) having a maximum diameter of 200 mm. and connected with a pipeline homomixer (a crusher made by Tokushukika Kogyo Kabushiki Kaisha), was charged with 150 liters of water and 30 kg. of a finely divided polytetrafluoroethylene having an average particle size of 15$\mu$, a bulk density of 250 g./liter and an angle of repose of 47 degree. With rotating the vane at a speed of 400 r.p.m., 15 liters of tetrachloroethane was introduced into the tank by spraying. At the same time as introducing tetrachloroethane, the slurry in the tank was circulated through the crusher at the ratio of 200 liters/min. for 3 minutes. For further 3 minutes, the agitation was continued. Then, the powder was separated from the aqueous medium and dried to give a polytetrafluoroethylene granular powder having a uniform size distribution as shown in Table 1.

The properties of the granular powder are shown in Table 5.

TABLE 1

| Sieve size (mesh) | Particle size | | | | | |
|---|---|---|---|---|---|---|
| | 10 | 20 | 32 | 48 | 60 | pass 60 |
| Sieve openings($\mu$) | 1651 | 833 | 495 | 295 | 246 | less than 246 |
| Proportions in the granules (%) | — | — | 1.2 | 28.5 | 60.5 | 9.6 |

EXAMPLE 2

The same procedure as in Example 1 was repeated except that the crusher was operated for 5 minutes without operating the agitator. The treated polytetrafluoroethylene powder was separated from the aqueous medium and dried.

The obtained polytetrafluoroethylene granular powder had a size distribution as shown in Table 2 and properties as shown in Table 5.

TABLE 2

| Sieve size (mesh) | Particle size | | | | | |
|---|---|---|---|---|---|---|
| | 10 | 20 | 32 | 48 | 60 | pass 60 |
| Sieve openings($\mu$) | 1651 | 833 | 495 | 295 | 246 | less than 246 |
| Proportions in the granules (%) | — | — | — | 23.5 | 67.3 | 9.2 |

COMPARATIVE EXAMPLE 1

The same procedure as in Example 1 was repeated except that the crusher did not operate.

The obtained polytetrafluoroethylene granular powder had a size distribution as shown in Table 3 and properties as shown in Table 5.

TABLE 3

| Sieve size (mesh) | Particle size | | | | | |
|---|---|---|---|---|---|---|
| | not pass 10 more than 1651 | 20 833 | 32 495 | 48 295 | 60 246 | pass 60 less than 246 |
| Proportions in the granules (%) | 3.7 | 21.2 | 56.7 | 15.5 | 2.0 | 1.7 |

EXAMPLE 3

The same procedure as in Example 1 was repeated except that a tank equipped with an agitator and a crusher, as shown in FIG. 3, was employed as an agglomerating vessel. As the crusher, "Homomixer" made by Tokushukika Kogyo Kabushiki Kaisha being capable of rotating at a speed of 300 r.p.m. was applied.

The obtained polytetrafluoroethylene granular powder had a size distribution as shown in Table 4 and properties as shown in Table 5.

TABLE 4

| Sieve size (mesh) | Particle size | | | | | |
|---|---|---|---|---|---|---|
| | not pass 10 more than 1651 | 20 833 | 32 495 | 48 295 | 60 246 | pass 60 less than 246 |
| Proportions in the granules (%) | — | — | 5.6 | 56.8 | 27.8 | 10.2 |

TABLE 5

| Example No. | Average particle size $\mu$ | Range of 0.7 to 1.3 times the average particle size (calculation) $\mu$ | Range of particle size corresponding to the range of cumulative percentages of 20 to 80 (found values) $\mu$ | Powder flowability | Bulk density g./liter | Surface roughness |
|---|---|---|---|---|---|---|
| 1 | 260 | 182–338 | 200–320 | 8 | 810 | 1.3 |
| 2 | 270 | 189–351 | 230–300 | 5 | 720 | 0.7 |
| 3 | 340 | 238–442 | 265–400 | 7 | 780 | 1.5 |
| Com. Ex. 1 | 660 | 462–858 | 470–920 | 2 | 720 | 2.8 |

The crusher employed in the above Examples 1 to 3 comprises a rotary cutter having a cutting, crushing or impact effect and a pumping effect and a stator, which is fixed around the cutter or behind the cutter, having an accelerating effect for a cutting action of the cutter. The agglomerated product of the finely divided polytetrafluoroethylene, which has uniform particles, can be obtained by employing the crusher together with the agitator. The desired particle size can be adjusted by a combination of a rotating speed and a structure of the stator. Moreover, the granular powder can be made more close to sphere by employing the crusher together with the agitator.

What we claim is:

1. A process for preparing a polytetrafluoroethylene granular powder which comprises agitating a finely divided polytetrafluoroethylene powder composed of primary particles having an average particle size of 1 to 200μ in an aqueous medium consisting of water and an organic liquid having a surface tension of at most 35 dynes/cm. at 25° C., said organic liquid being incompatible with water in an apparatus to form agglomerates, by passing said agglomerates through a crushing mechanism and continuously recycling said crushed agglomerates through said apparatus and mechanism for further agitation and crushing, said crushing mechanism being capable of lowering an average particle size of the agglomerates composed of said primary particles having an average particle size of 1 to 200μ by partially crushing large agglomerated particles, said organic liquid being employed in an amount of 20 to 300% by weight and water being employed in an amount of at least 130% by weight and said aqueous medium being employed in an amount of 150 to 5000% by weight, respectively, relative to said finely divided polytetrafluoroethylene, to give said polytetrafluoroethylene granular powder consisting essentially of agglomerates composed of said primary particles and being substantially spherical, in which at least 90% by weight of the entire agglomerated powder has a particle size of at most 1000μ and the average particle size of said agglomerate falls in the range of 100 to 500μ and at least 60% by weight of the agglomerated powder has a particle size of 0.7 to 1.3 times said average particle size of said agglomerated powder, the powder flowability of said powder being at least 3 and the bulk density being at least 700 g./liter, and said agglomerated powder giving a molded article having a surface roughness of at most 2.0.

2. The process of claim 1, wherein said finely divided polytetrafluoroethylene has an average particle size of 5 to 50μ.

3. The process of claim 1, wherein 60% by weight of said granular powder has a particle size of 0.75 to 1.25 times its average particle size.

4. The process of claim 1, wherein said granular powder gives a molded article having a surface roughness of at most 1.5.

5. The process of claim 1, wherein said agglomeration is carried out at a temperature of 30° to 200° C.

6. The process of claim 1, wherein said crushing mechanism is operated at the same time as said agitation.

7. The process of claim 1, wherein said crushing mechanism is operated after said agitation.

8. The process of claim 1, wherein said crushing is alternately carried out with said agitation.

9. The process of claim 1, wherein said organic liquid is introduced by means of spraying into the mixture of the finely divided polytetrafluoroethylene and water in the agitating vessel with agitation.

10. The process of claim 1, wherein said organic liquid is selected from the group consisting of aliphatic hydrocarbons, aromatic hydrocarbons, ethers, halogenated hydrocarbons and fluorine compounds.

11. Polytetrafluoroethylene granular powder made by the process which comprises agitating a finely divided polytetrafluoroethylene powder composed of primary particles having an average particle size of 1 to 200μ to agitation in an aqueous medium consisting of water and an organic liquid having a surface tension of at most 35 dynes/cm. at 25° C., said organic liquid being incompatible with water in an apparatus to form agglomerates, by passing said agglomerates through a crushing mechanism and continuously recycling said crushed agglomerates through said apparatus and mechanism for further agitation and crushing, said crushing mechanism being capable of lowering an average particle size of the agglomerates composed of said primary particles having an average particle size of 1 to 200μ by partially crushing large agglomerated particles having an improperly large particle size or abnormally large aggregates, said organic liquid being employed in an amount of 20 to 300% by weight and water being employed in an amount of at least 130% by weight and said aqueous medium being employed in an amount of 150 to 5000% by weight, respectively, relative to said finely divided polytetrafluoroethylene, to give said polytetrafluoroethylene granular powder consisting essentially of agglomerates composed of said primary particles and being substantially spherical, in which at least 90% by weight of the entire agglomerated powder has a particle size of at most 1000μ and an average particle size of said agglomerate powder falls in the range of 100 to 500μ and at least 60% by weight of the agglomerated powder has a particle size of 0.7 to 1.3 times said average particle size of said agglomerated powder, the powder flowability of said powder being at least 3 and the bulk density being at least 700 g./liter, and said granular powder giving a molded article having a surface roughness of at most 2.0.

* * * * *